United States Patent Office 3,823,091
Patented July 9, 1974

3,823,091
STABLE EMULSION OF FLUOROCARBON PARTICLES
Masayoshi Samejima, Minoo, Isao Sugimoto, Nara, Akira Suzuki, Taketsuki, Yoshiyuki Koida, Kawanishi, Goichi Hirata, Hirakata, and Goro Tsukamoto, Tokyo, Japan, assignors to The Green Cross Corporation and Tanage Seiyaku Co., Ltd.
No Drawing. Continuation-in-part of abandoned application Ser. No. 253,855, May 16, 1972. This application June 21, 1972, Ser. No. 264,732
Claims priority, application Japan, May 19, 1971, 46/33,911
Int. Cl. B01j 13/00
U.S. Cl. 252—312                              9 Claims

ABSTRACT OF THE DISCLOSURE

A dispersion containing 5–60 w./v. percent of fluorocarbon, 0.2–5 w./v. percent nonionic surfactant(s) and 2–20 w./v. percent polyalcohol(s) is emulsified under pressure. A stable emulsion of fluorocarbon particles having a particle diameter less than $0.2\mu$ is produced. The emulsion is useful as an artificial blood.

---

This application is a continuation-in-part of Ser. No. 253,855, filed May 16, 1972, now abandoned.

This invention relates to a process for preparing a stable emulsion of fluorocarbon particles, which is used as an artificial blood.

In recent years with the development of new surgical procedures, the need for blood for transfusion has increased. The quantity of blood available is insufficient to meet present needs. Furthermore blood transfusion occasionally leads to complication such as serum hepatitis or the like. This constitutes a serious problem.

To solve the aforementioned problems, research was initiated to develop an artificial blood. As a consequence of this research, it was discovered that fluorocarbon has an excellent ability to dissolve gas and may be used in place of hemoglobin as a medium for carrying biological gas. Moreover the use of an O/W fluorocarbon emulsion enables the production of a practical artificial blood.

Erythrocytes can pass through peripheral tissues by transforming to a certain degree as occasion demands. When fluorocarbon is used as an artificial blood, it needs to be emulsified in order to pass through the peripheral tissues. A suitable method for preparing stable fluorocarbon emulsions has heretofore been unknown.

Known emulsifying processes employ aqueous glucose solution, Ringer's solution, Ringer's albumin solution or an electrolyte total amino acid pentose solution as the liquid phase, and a polyoxyethylenepolyoxypropylene type nonionic surfactant as the emulsifying agent. Emulsions obtained by such processes cannot be sterilized by heating. This problem is not resolved by preparing the emulsion under sterile conditions because the emulsion is physically unstable. Dispersed fluorocarbon particles increase in size as time proceeds and separate from the liquid phase within several days. We have succeeded in preparing a stable O/W type emulsion of fluorocarbon particles, by emulsifying, under pressure, fluorocarbon having a certain range of specific gravity, in a polyalcohol liquid phase with the aid of a nonionic surfactant as the emulsifying agent.

Accordingly, it is an object of this invention to provide a stable emulsion of fluorocarbon particles, which may be used as an artificial blood.

It is another object of this invention to provide a physically stable emulsion of fluorocarbon particles, which may be sterilized by heating.

It is a further object of this invention to provide a stable emulsion of fluorocarbon particles which does not irreversibly separate upon long storage.

Other objects and advantages of the present invention will be apparent to those skilled in the art after reading the present disclosure.

In accordance with the present invention, there is provided a process for preparing a stable emulsion of fluorocarbon particles, which comprises emulsifying a dispersed solution containing 5 w./v. percent to 60 w./v. percent of fluorocarbon, 0.2 w./v. percent to 5 w./v. percent of at least one nonionic surfactant(s) and 2 w./v. percent to 20 w./v. percent of at least one polyalcohol(s), at increased pressure, to produce an emulsion of fluorocarbon particles having a diameter of less than $0.2\mu$.

The term fluorocarbon generally refers to an organic compound of which one or more hydrogen atoms are substituted by fluorine atom. The fluorocarbon of the present invention is additionally an inert liquid compound having a specific gravity of about 1.5 to about 2.0. It is substantially insoluble in water, and will not react with drugs. Further, the fluorocarbon of the invention is stable under high temperature and is insoluble and nonreactive with the components of the living body. Commercially available examples of such fluorocarbons include "Innate Liquid FC-43," which is perfluorotributylamine, $N(C_4F_9)_3$ with a boiling point of 174° C.; "Innate Liquid FC-75," which is perfluoro (2-butyl furan) with a boiling point of 102.2° C.: "Innate Liquid FC-78," which is perfluoro (N-methylmorpholine) with a boiling point of 50° C. and the like made by Minnesota Mining & Manufacturing Company; "Freon E4" which is 1,2,2,2-tetrafluoroethyl ether of perfluoro (2,5,8-trimethyl-3,6,9-trioxa-1-dodecanol) with a boiling point of 193° C., manufactured by DuPont Chemical; and perfluoro (1-methyldecaline) which boils at 160° C. The quantity of these fluorocarbons which may be employed in the practice of this invention depends on their ability to carry gas. A sufficient quantity thereof is generally 5 w./v. percent to 60 w./v. percent based on the total emulsion.

Preferred nonionic surfactants employed as emulsifying agents in this invention are those which do not contain pyrogen, are nonpoisonous and nonhemolytic. Examples of preferred surfactants include polyoxyethylene-hydrogenated castor oil, polyoxyethylene-polyoxypropylene type nonionic surfactant and/or the like. It is preferred that the nonionic surfactant be purified prior to use. The surfactant may be purified by making a 10% aqueous surfactant solution and then dialyzing it against water using visking cellophane tube, or by passing same through strong acid cation exchange resin and then strong base anion exchange resin.

A combination of nonionic surfactants may be employed. Generally 0.2 w./v. percent to 5 w./v. percent based the total emulsion of nonionic surfactant is employed.

Polyalcohols employed in the invention are generally selected from those commonly used for these injections or the like. These polyalcohols, such as glycerol, propyleneglycol, sorbitol, xylitol and/or the like, are preferred. Combinations of polyalcohols may be employed. Generally 2 w./v. percent to 20 w./v. percent based on the total emulsion of polyalcohols(s) is employed.

The emulsion of the present invention is prepared, for example, by admixing the fluorocarbon, the nonionic surfactant(s) and the polyalcohol(s) with water, emulsifying the mixture under pressure, and then filtering the resultant emulsion through a microporous filter of about $0.45\mu$ to about $0.8\mu$ mesh (e.g. commercial name "Millipore Filter" made by Millipore Filter Co., "Micro Filter" made by Fuji Film Co. and the like). Prior to filtration, it is preferred that the pH of the emulsion be adjusted to the pH of body fluid by addition of phosphate, carbonate, citrate or the like.

The thus obtained emulsion is preferably sterilized by heating in an airtight vessel such as ampule, vial or the like.

The emulsion of fluorocarbon particles obtained according to this invention may for example be injected by venoclysis, as auxiliary blood, in the course of an operation. Moreover, it may be used in perfusion solution for preserving internal organs for transplantation.

EXPERIMENT 1

Fluorocarbon emulsions were prepared according to the following formulas A–D. Each of the emulsions was prepared according to the method of the following Example 1. 50 ml. of the produced emulsion was sealed in a test tube equipped with a ground glass stopper and having an inside diameter of 20 mm. Samples A, B, C and D were thereby obtained. The sedimentation rate of each sample was regularly determined. The results are shown in Table 1.

FORMULA A

| | G. |
|---|---|
| "Innate Liquid FC–75" | 30 |
| (Specific gravity at 25° C.: 1.76) | |
| Polyoxyethylene-hydrogenated castor oil | 2.0 |

(commercially available as "Nikkol HCO–60" made by Nikko Chemicals Co. which freezes at about 26–30° C., and is a condensation product of 1 mol of hydrogenated castor oil with about 60 mol of oxyethylene radical)

| | G. |
|---|---|
| Soda phosphate $Na_2HPO_4 \cdot 12H_2O$ | 0.01 |
| Distilled water | 80 |

FORMULA B 5.0 g. of xylitol were added to Formula A.

FORMULA C

| | G. |
|---|---|
| "Innate Liquid FC–43" | 30 |
| (Specific gravity at 25° C.: 1.87) | |
| Polyoxyethylene-polyoxypropylene type nonionic sulfactant | 2.0 |

(commercially available as "Pluronic-F68" a trademark of Wyandotte Chemical. It is a polyoxyethylene-polyoxypropylene condensate having an ethyleneoxide content of 80% and a molecular weight of 8350.)

| | G. |
|---|---|
| Soda phosphate $Na_2HPO_4 \cdot 12H_2O$ | 0.01 |
| Distilled water | 80 |

FORMULA D 2.5 g. of glycerol were added to Formula C.

In each of the formulas A–D where grams are reported, grams per 100 ml. of emulsion is intended.

TABLE 1

| | Sample | | | |
|---|---|---|---|---|
| Time | A (cm.) | B (cm.) | C (cm.) | D (cm.) |
| 2 days after preparation | (¹) | (¹) | (¹) | (¹) |
| 7 days after preparation | 15.0 | (¹) | 15.2 | (¹) |
| 14 days after preparation | 13.8 | 15.0 | 13.6 | 15.2 |
| 1 month after preparation | 12.0 | 14.5 | 12.1 | 14.8 |
| 3 months after preparation | 10.5 | 14.1 | 9.7 | 14.3 |

¹ No sedimentation.

Numerals in the Table indicate the height of sedimentation layers as determined at 30° C.

As shown in Table 1, samples A and C began to separate after only about 7 days from the date of their preparation, sample B (containing xylitol) and sample D (containing glycerol) began to separate after about 14 days.

3 months from the date of their preparation, samples A and C were violently shaken and the diameters of the dispersed fluorocarbon particles of samples A and C were then respectively microscopically determined. It was found that the average diameter of the fluorocarbon particles had increased from 1μ (on preparation) to over 2μ (3 months after preparation). In contrast thereto, although sample B (containing xylitol) and sample D (containing glycerol) showed slight separation with the passage of time, they showed no change in average particle diameter 3 months after preparation. Their average particles diameter (1μ) remainder constant.

The present invention is illustrated but in no way intended to be limited by the following examples:

EXAMPLE 1

100 g. of xylitol and 5 g. of polyoxyethylenehydrogenated castor oil were added to 500 ml. of distilled water for injection and dissolved therein by heating at 60° C.–70° C. 500 g. of "Innate Liquid FC–75" (specific gravity at 25° C.: 1.76) pre-heated to 60° C. were gradually poured into the resultant solution, under vigorous stirring. A crude emulsion was produced. Sufficient distilled water for injection was added to the crude emulsion to bring it up to 1000 ml. 80 mg. of $Na_2HPO_4 \cdot 12H_2O$ were then added thereto to adjust the pH to 7.4. The crude emulsion was placed in a high pressure emulsifier (Manton-Gaulin type) and emulsified by circulating it for 5 minutes under a pressure of 450 kg./cm.². The thus obtained emulsion was filtered through a 0.8μ "Millipore Filter." The filtrate was poured into duplicate vials and sealed. The samples were sterilized twice at 90° C. for 30 minutes, at 24 hour intervals. A sterile emulsion of fluorocarbon particles was thereby obtained.

EXAMPLE 2

200 g. of sorbitol and 20 g. of polyoxyethylene polyoxypropylene type nonionic surfactant were added to 400 ml. of distilled water for injection and dissolved therein by heating at 60° C.–70° C. 300 g. of 1,2,2,2-tetrafluoroethyl ether of perfluoro(2,5,8-trimethyl-3,6,9-trioxa-1-dodecanol) (b.p. 193° C.) preheated to 60° C. were gradually poured into the resultant solution, under vigorous stirring. A crude emulsion was produced. Sufficient distilled water for injection was added to the crude emulsion to bring it up to 1000 ml. 25 mg. of $Na_2HPO_4 \cdot 12H_2O$ were added thereto to adjust the pH to 7.4. The crude emulsion was then treated in the manner described in Example 1. An emulsion of fluorocarbon particles was obtained.

EXAMPLE 3

25 g. of glycerol and 20 g. of polyoxyethylene-polyoxypropylene type nonionic surfactant were added to 500 ml. of distilled water for injection and dissolved therein by heating at 60° C.–70° C. 300 g. of "Inmate Liquid FC–43" (specific gravity at 25° C.: 1.87) preheated to 80° C. were gradually poured into the resultant solution under vigorous stirring. A crude emulsion was produced. Sufficient distilled water for injection was added to the crude emulsion to bring it up to 1000 ml. 80 mg. of $Na_2HPO_4 \cdot 12H_2O$ were added thereto to adjust the pH to 7.4. The crude emulsion was then treated in the manner described in Example 1. An emulsion of fluorocarbon particles was obtained.

EXAMPLE 4

25 g. of glycerol and 15 g. of polyoxyethylene-hydrogenated castor oil were added to 600 ml. of distilled water for injection and dissolved therein by heating at 60° C.–70° C. 200 g. of "Innate Liquid FC–78" (specific gravity at 25° C.: 1.70) preheated to 60° C. were gradually poured into the resultant solution under vigorous stirring. A crude emulsion was produced. Sufficient distilled water for injection was added to the crude emulsion to bring it up to 1000 ml. 120 mg. of $Na_2HPO_4 \cdot 12H_2O$ were added thereto to adjust the pH to 7.4. The crude emulsion was then treated in the manner described in Example 1. An emulsion of fluorocarbon particles was obtained.

What is claimed is:

1. An O/W emulsion comprising 5 to 60 w./v. percent, based on the emulsion, of a fluorocarbon selected from the group consisting of perfluorotributylamine, perfluoro(2-butylfuran), 1,2,2,2-tetrafluoroethyl ether of perfluoro(2,5,8-trimethyl-3,6,9-trioxa-1-dodecanol) and perfluoro(1-methyldecaline); 0.2 to 5 w./v. percent, based on the emulsion, of at least one polyoxyethylene-hydrogenated castor oil or polyoxyethylene-polyoxypropylene condensate; 2 to 20 w./v. percent, based on the emulsion, of at least one polyalcohol; and a sufficient amount of water to bring the emulsion up to 100 w./v. percent, said fluorocarbon constituting the dispersed phase of said emulsion, particles of dispersed fluorocarbon having a diameter of less than $0.2\mu$.

2. The O/W emulsion as claimed in claim 1 wherein said polyalcohol is selected from the group consisting of glycerol, propyleneglycol, sorbitol and xylitol.

3. The O/W emulsion as claimed in claim 1 wherein said polyoxyethylene-hydrogenated castor oil is a condensation product of 1 mol of hydrogenated castor oil with about 60 mol of oxyethylene radical.

4. The O/W emulsion as claimed in claim 1 wherein said polyoxyethylene-polyoxypropylene condensate has an ethyleneoxide content of 80% and a molecular weight of 8350.

5. A process for preparing a stable emulsion of claim 1 which comprises emulsifying a mixture of water and 5 to 60 w./v. percent, based on the emulsion, of a fluorocarbon; said fluorocarbon being selected from the group consisting of perfluorotributylamine, perfluoro (2-butylfuran), 1,2,2,2-tetrafluoroethyl ether of perfluoro (2,5,8-trimethyl-3,6,9-trioxa-1-dodecanol) and perfluoro (1-methyldecaline); with the aid of 2 to 20 w./v. percent, based on the emulsion, of at least one polyalcohol; and 0.2–5 w./v. percent, based on the emulsion, of at least one polyoxyethylene-hydrogenated castor oil or polyoxyethylene-polyoxypropylene condensate to produce an O/W emulsion of fluorocarbon particles having a diameter of less than $0.2\mu$.

6. The process according to claim 5 wherein said polyalcohol is selected from the group consisting of glycerol, propyleneglycol, sorbitol and xylitol.

7. The process according to claim 6 wherein said polyoxyethylene-hydrogenated castor oil is a condensation product of 1 mol of hydrogenated castor oil with about 60 mol of oxyethylene radical.

8. The process according to claim 3 wherein said polyoxyethylene-polyoxypropylene condensate has an ethylene oxide content of 80% and a molecular weight of 8350.

9. The process according to claim 5 further including the steps of filtering the emulsion through a microporous filter of about 0.45 to about $0.8\mu$ mesh, and then sterilizing the filtered emulsion by heating same in an airtight vessel.

References Cited

Hudlicky: Chemistry of Organic Fluorine Compounds, MacMillan (1962), pp. 346–7.

JOHN D. WELSH, Primary Examiner

U.S. Cl. X.R.

252—184; 424—75, 342, 350, 366